United States Patent [19]
Mihara

[11] Patent Number: 5,313,331
[45] Date of Patent: May 17, 1994

[54] ZOOM LENS SYSTEM HAVING A SHORT TOTAL LENGTH

[75] Inventor: Shinichi Mihara, Tokyo, Japan

[73] Assignee: Olympus Optical Co., Ltd., Tokyo, Japan

[21] Appl. No.: 17,370

[22] Filed: Feb. 12, 1993

Related U.S. Application Data

[63] Continuation of Ser. No. 939,597, Sep. 2, 1992, abandoned.

[30] Foreign Application Priority Data

Sep. 2, 1991 [JP] Japan .................. 3-221698

[51] Int. Cl.⁵ .............. G02B 15/14; G02B 13/18
[52] U.S. Cl. .................. 359/687; 359/885; 359/708
[58] Field of Search ............ 359/687, 885, 708

[56] References Cited

U.S. PATENT DOCUMENTS

| | | | |
|---|---|---|---|
| 4,859,042 | 8/1989 | Tanaka | 359/684 |
| 5,000,551 | 3/1991 | Shibayama | 359/687 |
| 5,189,558 | 2/1993 | Ishii et al. | 359/687 |
| 5,221,994 | 6/1993 | Nishio | 359/687 |

FOREIGN PATENT DOCUMENTS 62-178917  8/1987  Japan .

*Primary Examiner*—Edward K. Look
*Assistant Examiner*—Michael S. Lee
*Attorney, Agent, or Firm*—Cushman, Darby & Cushman

[57] ABSTRACT

The present invention relates to a zoom lens system which comprises ten or less lenses, has a very short total length and a small front lens diameter, is reduced in size, weight and cost and has a large aperture ratio and a high zoom ratio. This zoom lens system comprises a zoom subsystem consisting of a first lens unit having a positive refracting power and a second lens unit having a negative refracting power and an image formation subsystem consisting of a third lens unit having a positive refracting power and remaining constantly fixed and a fourth lens unit having a positive refracting power and movable for zooming and focal position regulation and which has a zoom ratio of 8, a field angle of 1.4 and a very short total length including filters, as expressed by 9.7 $f_W$ at 54°, is reasonably and well balanced for various aberrations inclusive of spherical aberration, and has a very excellent capability of forming images by adopting some suitable means for the paraxial arrangement, actual lens configuration and arrangement of the image formation subsystem, applying aspherical configuration to a part thereof and taking some pertinent means for the positions of various optical filters.

4 Claims, 3 Drawing Sheets

ZOOM LENS SYSTEM HAVING A SHORT TOTAL LENGTH

This is a continuation of application Ser. No. 07/939,597, filed on Sep. 2, 1992, now abandoned.

BACKGROUND OF THE INVENTION

The present invention relates to a zoom lens system which comprises four lens units, makes use of a rear focus and has a short total length, a large aperture and a high zoom ratio.

Recently radical reductions in the size, weight and cost of video cameras have caused the camcorder market to grow vigorously. The market growth has allowed widespread use of camcorders. Mainly, the video camera comprises an electric circuit board, an actuator (mechanical) system and an optical system. So far, the size and cost reductions have been achieved in terms of the electrical system in particular. More recently, however, some considerable reduction in the size of an image sensor optical system has made sharp progress. At present, the size and cost reductions of the image sensor optical system are being achieved by the development of a new zoom type lens systems making effective use of the progress in techniques for miniaturizing images, processing aspherical surfaces rotation-symmetrically and automatic TTL focusing. Several examples of those novel zoom lenses are set forth in JP-Kokai-62-24213, JP-Kokai-62-178917, JP-Kokai-62-215225, etc. However, the present need for size and weight reductions, esp., reductions in the total length and the diameter of front lenses, is immense.

Referring now to techniques prior to the above-mentioned prior art, for instance, JP-Kokai-60-186818 (a zoom lens of eight magnifications), the zoom lens system disclosed therein comprises a zoom subsystem constructed from a first unit having a positive refracting power, movable for focusing and consisting of, in order from the object side, a negative lens, a positive lens and a positive lens, a second unit having a negative refractive power, movable for zooming and consisting of, in order from the object side, a negative lens, a negative lens and a positive lens, and a third unit having a negative refractive power, disposed so as to correct variations of the position of an image due to zooming, the third lens being movable and consisting of a meniscus-form of negative lens component strongly concave on the object side; and an image formation subsystem constructed from a stop and a relay lens unit. This is an example of the zoom lens system having a long total length and a front lens with a large diameter. The first unit is designed to be movable for focusing, in which case it is likely that variations of spherical aberration may be increased by focusing in the vicinity of the telephoto end, thus making it impossible to increase the power strongly enough. Accordingly, the image location due to the first unit (i.e., the object point of the second unit) becomes so far that the power of the second unit can become weak and so much space is required for the movement of the second unit, resulting in an increase in the total length of the zoom subsystem. In addition, when the powers of the first and second units are weak, the location of the entrance pupil is imperatively deep (as viewed from the object side). In particular, the lens diameter of the first unit should not be increased; nor should the lens thickness be increased so as to assure the edge thickness of the convex lens. This in turn leads to an increase in the depth of the entrance pupil, resulting in a massive increase in the size of front lens and, hence, a further increase in the total length of the zoom subsystem. To add to this, consideration must be taken of a further increase in the depth of the entrance pupil when a near-by object point is brought into focus. This is because focusing is achieved by the first unit. For those reasons, such rear focus versions are set forth in the above-mentioned JP-Kokai-62-24213, 62-178917 and 62-215225 and some versions in which the compensator unit is located in the rear of a stop have now been adopted. These versions may possibly have astonishing latent faculties of reducing the total length and making the front lens diameter small. Referring especially to JP-Kokai-62-178917, it teaches that some considerable reduction in the number of constituent lenses is achieved by applying an aspherical surface to the above-mentioned image formation subsystem and some correction of aberrations is also attained. However, any size reduction cannot be achieved with the total length and front lens diameter without making substantial changes with respect to conventional or classical lens configurations.

That is to say, the system disclosed in JP-Kokai-62-178917 comprises a zoom subsystem including a first unit having a positive refracting power and a second unit having a negative refracting power and an image formation subsystem including a third unit consisting solely of a positive single lens having an aspherical surface and always remaining fixed and a fourth unit having at least one negative lens or consisting generally of two or three lenses and being movable during zooming and for regulating the focal position depending on how far the subject is spaced. Thus, the use of the rear focus which also serves as a compensator and the aspherical surface renders it possible to reduce the number of constituent lenses to ten or below, thereby reducing extra space. This thus enables the front lens diameter to be reduced and makes it possible to reduce the total length. The rear focus configuration could make it easy to increase the power of the first unit. However, this is not the case and the power of the second unit remains weak as well. In addition, using a single lens for the third unit incurs another disadvantage. In other words, the luminous flux cannot be easily converged here, so that it can not leave a focally. For this reason, there is no choice but to increase the focal length of the fourth unit, and the back focus remains long as well; that is, no sufficient reductions in the total length, front lens diameter, etc. are achieved.

SUMMARY OF THE INVENTION

In view of such situations as mentioned above, it is therefore an object of this invention to provide a zoom lens system which comprises ten or less constituent lenses in all, has a very short total length, includes a small front lens diameter, is greatly reduced in size, weight and cost, and has a large aperture ratio and a high zoom ratio by setting the power level of each of the lens units constituting a zoom lens system comprising a zoom subsystem consisting of a first unit having a positive refracting power and a second unit having a negative refracting power and an image formation subsystem consisting of a third unit having a positive refracting power and remaining constantly fixed and a fourth unit having a positive refracting power and movable during zooming and for focal position regulation and adopting some suitable means for the lens configurations of the third and fourth units.

In order to attain the object mentioned above, the present invention provides a zoom lens system including, in order from the object side, a first lens unit having a positive refracting power, a second lens unit having a negative refracting power and being movable along the optical axis for zooming, a third lens unit having a positive refracting power and a fourth lens unit having a positive refracting power and movable along the optical axis for zooming and focusing, said third lens unit comprising, in order from the object side, a positive lens in which the object-side surface has a strong converging action and takes an aspherical surface whose amount of displacement from the reference surface to the object side increases monotonously as it is spaced away from the optical axis, a positive lens in which the object-side surface has a stronger curvature and a negative lens in which the image-side surface has a stronger curvature, said fourth lens unit comprising a positive single lens in which the object-side surface takes an aspherical surface whose amount of displacement from the reference spherical surface to the object side increases monotonously as it is spaced away from the optical axis, and said zoom lens system further including an optical member such as a moire-preventing or infrared-cutting filter between the two positive lenses of said third lens unit and meeting the following conditions:

$$0.45 < f_{34S}/(f_W f_T)^{\frac{1}{2}} < 0.9, \quad (1)$$

$$0.3 < \beta_{IV} < 0.6, \quad (2)$$

$$0.6 < r_{31}/\{(n_{31} - 1)(f_W f_T)^{\frac{1}{2}}\} < 1.2, \quad (3)$$

$$0.28 < r_{36}/\{(n_{36} - 1)(f_W f_T)^{\frac{1}{2}}\} < 0.56, \quad (4)$$

and $$0.38 < D_{III}/(f_W f_T)^{\frac{1}{2}} < 0.76, \quad (5)$$

where:

$f_W$ and $f_T$ are the focal lengths of the total system at the wide angle and telephoto ends, respectively, $f_{34S}$ is the composite focal length of the third and fourth lens units when the focal length of the total system lies at $(f_W f_T)^{\frac{1}{2}}$ and the object point at infinity is focused, $\beta_{IV}$ is the magnification of the fourth lens unit at the telephoto end and the object point at infinity is focused, $r_{31}$ is the radius of curvature of the reference spherical surface of the third lens unit proximate to the object side, $r_{36}$ is the radius of curvature of the surface of the third lens unit proximate to the image side, $n_{31}$ and $n_{36}$ are the refractive indices of the positive and negative lenses of the third lens unit proximate to the object and image sides, respectively, and $D_{III}$ is the distance between the apices of the surfaces of the third lens unit proximate to the object and image sides, respectively.

It is possible to reduce the total length of the system considerably by applying some measure to the image formation subsystem, as stated above. However, it is understood that further reductions in the total length can be attained by conforming to the following conditions:

$$0.7 < f_I/\{f_T(f_W f_T)^{\frac{1}{2}}\}^{\frac{1}{2}} < 1.4, \quad (6)$$

and $$0.26 < |f_{II}|/(f_W f_T)^{\frac{1}{2}} < 0.52, \quad (7)$$

where:

$f_I$ is the focal length of the first lens unit, and $f_{II}$ is the focal length of the second lens unit.

In order for the aberrations of this lens system to be more advantageously corrected, it is desired that the above-mentioned image formation subsystem conform to the following conditions, thereby achieving a lens system having improved image forming properties and a smaller front lens diameter:

$$-0.16 < f_W f_T/r_{34} r_{35} < -0.08, \quad (8)$$

and $$0.5 < SF_{41} < 1.0, \quad (9)$$

where:

$r_{34}$ and $r_{35}$ are the radii of curvature of the image-side surface of the positive lens of the third lens unit located on the image side and of the object-side surface of the negative lens of the third lens unit, respectively, and $SF_{41}$ is the shape factor of the positive lens of the fourth lens.

It is further desired that the first lens unit includes, in order from the object side, a negative meniscus lens convex on the object side, a positive lens and a positive lens and the second lens unit includes, in order from the object side, a negative lens and a cemented negative lens obtained by cementing a bi-concave lens to a positive lens, and that the following conditions be satisfied:

$$0.3 \times 10^{-2} < f_W f_T/r_3/r_5 < 0.6 \times 10^{-2}, \text{ and} \quad (10)$$

$$1.45 < n_5 < n_6 - 0.25, \quad (11)$$

where:

$r_3$ and $r_5$ are the radii of curvature of the image-side surface of the object-side positive lens of the first lens unit and of the image-side surface of the image-side positive lens of the first lens unit, respectively, and $n_5$ and $n_6$ are the refractive indices of the respective lenses of the cemented lens of the second lens unit.

In the ensuing description, what is meant and accomplished by the respective conditions mentioned above will be described.

Accordingly, this invention, the reduction in the total length of the zoom lens system is attained by making the conjugate of the above-mentioned image formation subsystem short. To implement this, the following (i) and (ii) should be achieved.

(i) The distance between the front and rear principal points is reduced by making the total thickness of the above-mentioned image formation subsystem thin or otherwise providing some suitable structure.

(ii) The focal length of the above-mentioned image formation subsystem is reduced.

Important for such purposes is the reduction in the number of lenses constituting the above-mentioned image formation subsystem as much as possible. Three positive lenses and one negative lens would be sufficient for reducing the focal length while compensating for the chromatic aberration and Petzval's sum. Since the shorter the conjugate of the above mentioned image formation subsystem, the more likely the second and third lens units are to interfere mechanically with each other in the vicinity of the telephoto end. However, if the third lens unit includes, in order from the object side, two positive lenses and one negative lens, three in all, the fourth lens unit includes one lens and the conditions (1)–(5) are met, it is then possible to make the conjugate of the above-mentioned image formation subsystem short and avoid any mechanical interference of the second and third lens units.

Referring first to the third lens unit, it includes, in order from the object side, a positive lens in which the object-side surface has a stronger radius of curvature and takes an aspherical surface, a positive lens in which the object-side surface again has a stronger radius of curvature and a negative lens in which the image-side surface has a stronger radius of curvature, while the whole or a part of various filters so far disposed just before image sensor elements is disposed between the two positive lenses of the third lens unit, thereby making it easy to reduce the distance between the principal points of the image formation subsystem or the composite focal length. This in turn renders it easy to shorten the conjugate of the image information subsystem. In particular, the provision of various filters in the third lens unit ensures a large space between the surface of the third lens unit that is of the highest convergence and proximate to the object side and the surface of the third lens unit that is of the highest divergence and proximate to the image side with no need to provide any extra space. It is thus possible to locate the principal point of the third lens unit on the side of the second lens unit without degradation of aberrations and easy to shorten the focal length of the third lens unit. If the focal length of the third lens unit is reduced, it is then easy to shorten the focal length of the fourth lens unit and possible to shorten the back focus, with the result that the conjugate of the image formation subsystem can be reduced.

In view of reducing aberrational variations due to focusing, the luminous flux leaving the third lens unit should preferably be as close to an afocal state as possible. However, if aberrational variations standing up to practical use are permissible, the exit luminous flux should preferably be somewhat converged. This is because the back focus can be made shorter, so that any wasteful space (esp., a back focus region) can be removed.

Reference will now be made to the background of the respective conditions.

Condition (1) defines the composite focal length of the third and fourth lens units when the focal length of the total system lies at $(f_W f_T)^{\frac{1}{2}}$ or, in other word, in the standard state. Exceeding the upper limit results in an increase in the conjugate of the image formation subsystem or fails to achieve the purpose of this invention. Falling short of the lower limit, on the other hand, is unpreferred, because the second lens unit is likely to interfere mechanically with the third lens unit.

Condition (2) defines the magnification of the fourth lens unit at the telephoto end when the object point at infinity is focused. Below the lower limit, there is an increase in the space between the principal points of the image formation subsystem, making it likely to increase the total length. On the other hand, exceeding the upper limit is not preferred, because the amount of extension of the fourth lens unit for focusing is so increased that a considerable space between the fourth and third lens units is needed.

Conditions (3) and (4) define the powers of the surfaces of the third lens unit proximate to the object and image sides, respectively, and condition (5) defines the space between the verticles of both the surfaces. Of the two surfaces, one is a strongly convergent surface and the other a strongly divergent surface. By allowing them to be spaced away from each other at a certain interval, it is possible to locate an actual lens on the image side with respect to the principal point of the third lens unit, thereby avoiding the mechanical interference of the third lens unit with the second lens unit. When the upper limits of Conditions (3) and (4) are exceeded, the third lens unit is likely to interfere mechanically with the second lens unit, making it impossible to achieve a high zoom ratio. When the lower limits are not reached, on the other hand, some difficulty is involved in correcting such aberrations as spherical aberration and coma, even though use is made of aspherical configuration. If the upper limit of Condition (5) is exceeded, then the space between the principal points of the image formation subsystem tends to increase, whereas if the lower limit is not reached, then the third lens unit is likely to interfere mechanically with the second lens unit.

As mentioned above, the image formation subsystem can be reduced in conjugate and its mechanical interference with the zoom subsystem can be avoided: that is, it is possible to obtain a zoom lens system having a short total length.

If some condition favorable for reducing the total length and correcting aberrations is provided for the image formation subsystem, then it is possible to obtain a zoom lens system which has a much shorter total length and a much better capability of forming images. Conditions (6) and (7) define the focal lengths of the first and second lens units, respectively. Above the upper limits, the total length of the zoom subsystem tends to increase with an increase in the front lens diameter. Below the lower limits, on the other hand, aberrational variations (esp., as to spherical aberration, coma and astigmatism) tend to increase.

If the image formation subsystem conforms to Conditions (8) and (9), even much improved correction of aberrations is then achieved.

Condition (8) defines the air lens configuration sandwiched between the positive and negative meniscus lens in the image formation subsystem. Deviation from this range makes the meridional image surface likely to curve on the negative side.

Condition (9) defines the shape factor of the positive lens of the fourth lens unit. By definition, the shape factor of a positive lens is given by $$(r_F + r_R)/(r_F - r_R).$$

Here $r_F$ is the paraxial radius of curvature of the surface of the positive lens proximate to the object side and $r_R$ is the paraxial radius of curvature of the surface of the positive lens proximate to the image side. Below the lower limit barrel form distortion is generally likely to occur even though an aspherical configuration is used, whereas above the upper limit it is difficult to achieve sufficient correction of coma.

When the first lens unit includes, in order from the object side, three lenses, say, a negative meniscus lens, a positive lens, condition (2) defines the product of the radii of curvature of the surfaces of the two positive lenses on the image side. Below the lower limit the meridional image surface is likely to curve on the negative side. This may be compensated for by applying an aspherical configuration to the positive lens of the fourth lens unit. Especially when use is made of no aspherical configuration, however, it is desired to conform to this condition. Above the upper limit, on the other hand, the entrance pupil is likely to go far, thus making it likely to increase the front lens diameter considerably.

Condition (11) defines the difference in the refractive indices of the vitreous materials forming the negative and positive lenses of the cemented lens of the second lens unit. In order to reduce the total length while assuring high zoom ratios and reducing the movable range as much as possible, it is required to enhance the power of the second lens unit, as defined by condition (7). However, too large a power increase is likely to give rise to large aberrational variations during zooming. To avoid this it is preferable to increase the difference in the refractive indices of the cemented surfaces as much as possible. The sufficient difference in the refractive indices makes it possible to reduce variations of coma and astigmatism. When the central sign of inequality of condition (10) is reversed, some difficulty is involved in reducing variations of spherical aberration, coma and astigmatism during zooming. The signs of inequality of this condition at both its ends define the actual range of vitreous material.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated.

DESCRIPTION OF THE PREFERRED EMBODIMENTS

Figure 1:
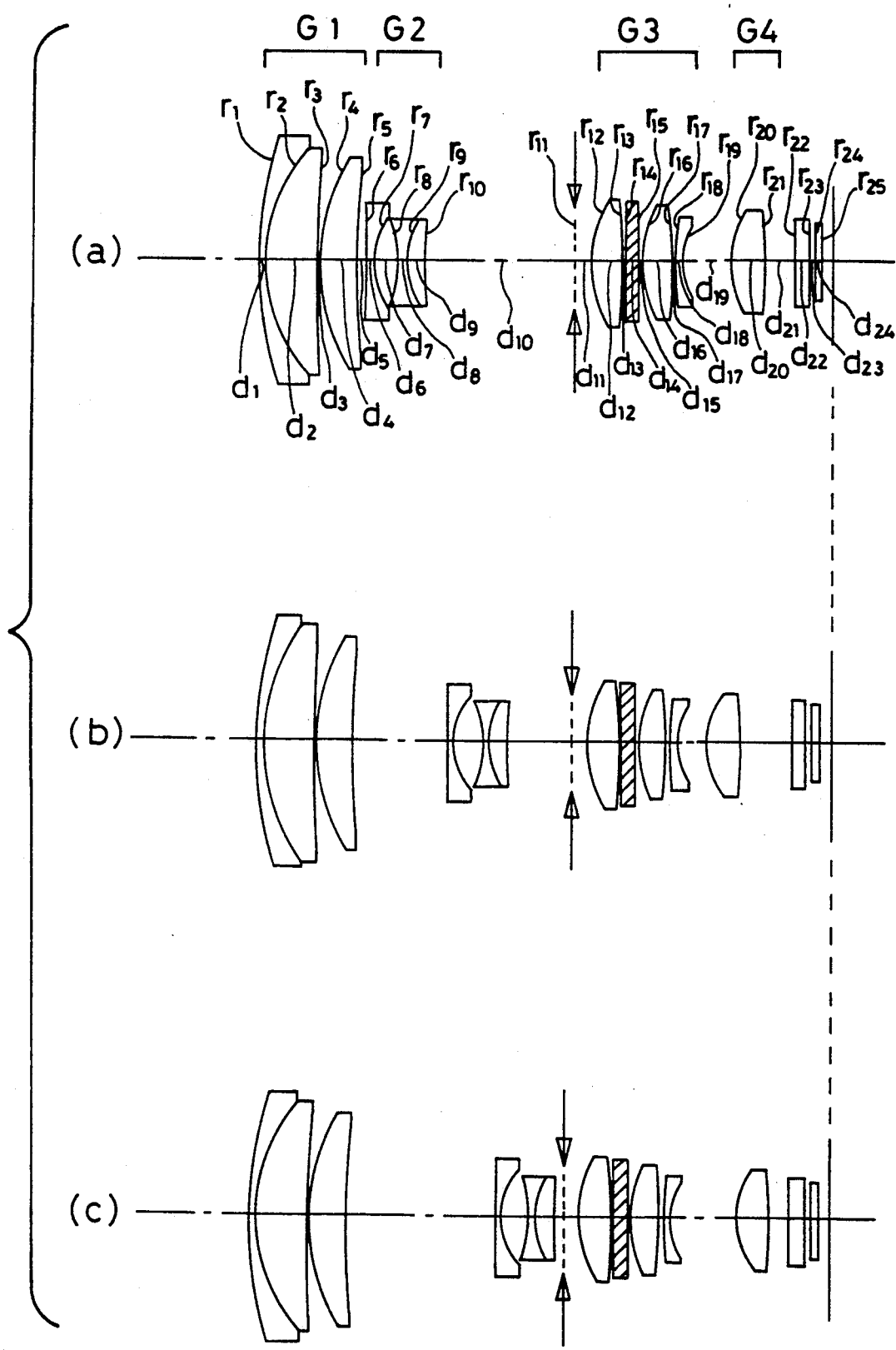
FIG. 1(a)-(c) illustrates sectional views of the lens arrangements of Example 1 at the (a) wide angle end, (b) standard and (c) telephoto end settings.

In the following description, reference will be made to Examples 1 and 2 of the zoom lens system according to the present invention, the lens data of which will be enumerated. The sections of the lens arrangements of Ex. 1 at the (a) wide angle end, (b) standard and (c) telephoto end settings are shown in FIG. 1. Note that the lens arrangement sections and moving orbits of Ex. 2 are not shown because of being similar to those of Ex. 1.

In Example 1 or 2, the first lens unit G1 includes, in order from the object side, three lenses, say, a cemented lens obtained by cementing a negative meniscus lens convex on the object side to a positive meniscus lens and a positive meniscus lens convex on the object side; the second lens unit G2 includes, in order from the object side, three lenses, say, a negative meniscus lens convex on the object side and a cemented lens obtained by cementing a bi-concave lens to a positive meniscus lens convex on the object side; the third lens unit G3 includes, in order from the object side, three lenses, say, two bi-convex lenses in which the object-side surfaces have a stronger curvature and a negative meniscus lens convex on the object side, and includes an optical member such as a filter between the two bi-convex positive lenses; and the fourth lens unit G4 consists solely of a bi-convex positive lens. Turning here to aspherical configuration, three aspherical surfaces are applied to both surfaces of the positive lens of the third lens unit G3 proximate to the object side and to the surface of the fourth lens unit G4 proximate to the object side in Example 1; and three aspherical surfaces are applied to the surfaces of the two positive lenses of the third lens unit G3 on the object side and to the surface of the fourth lens unit G4 proximate to the object side. Note that in each example, the 22nd to 25th surfaces stand for optical members such as filters.

In what follows, the symbols used hereinafter but not mentioned hereinbefore means: f: the focal length of the total system $F_{NO}$: the F-number
$\omega$: the half field angle
$r_1, r_2, \ldots$: the radii of curvature of the respective lens surfaces
$d_1, d_2, \ldots$: the spacings between the respective lens surfaces
$n_{d1}, n_{d2}, \ldots$: the d-line refractive indices of the respective lenses
$\gamma_{d1}\gamma_{d2}, \ldots$: the Abbe's numbers of the repsective lenses It is understood that letting x denote the optical axis direction and y denote the direction orthogonal to the optical axis, of the aspherical configuration is represented by $$x = (y^2/r)/[+\{1-P(y^2/r^2)\}^{\frac{1}{2}}] + A_4 Y^4 + A_6 Y^6 + A_8 Y^8 + A_{10} Y^{10}$$

where r is the paraxial radius of curvature, P the conical coefficient and $A_4$, $A_6$, $A_8$, and $A_{10}$ the aspherical surface coefficients.

EXAMPLE 1

```
          f = 6.180 ~ 16.963 ~ 46.560
          F NO = 1.44 ~ 1.57 ~ 2.10
          ω = 27.0 ~ 10.5 ~ 3.9°
```

| | | | |
|---|---|---|---|
| r1 = 38.0911 | d1 = 0.9000 | n d1 = 1.84666 | ν d1 = 23.78 |
| r2 = 18.9809 | d2 = 5.4500 | n d2 = 1.58913 | ν d2 = 61.18 |
| r3 = 429.1190 | d3 = 0.1500 | | |
| r4 = 20.9997 | d4 = 3.9000 | n d3 = 1.68250 | ν d3 = 44.65 |
| r5 = 143.9685 | d5 = (Variable) | | |
| r6 = 142.0798 | d6 = 0.7500 | n d4 = 1.80610 | ν d4 = 40.95 |
| r7 = 6.4665 | d7 = 2.9500 | | |
| r8 = −10.6069 | d8 = 0.7000 | n d5 = 1.48749 | ν d5 = 70.20 |
| r9 = 9.4209 | d9 = 2.0000 | n d6 = 1.84666 | ν d6 = 23.78 |
| r10 = 55.7542 | d10 = (Variable) | | |
| r11 = ∞ (Stop) | d11 = 1.5000 | | |
| r12 = 10.2778 (Aspheric) | d12 = 3.6000 | n d7 = 1.67790 | ν d7 = 55.33 |
| r13 = −49.8642 (Aspheric) | d13 = 0.2500 | | |
| r14 = ∞ | d14 = 1.4000 | n d8 = 1.49216 | ν d8 = 57.50 |

-continued

| | | | |
|---|---|---|---|
| r15 = ∞ | d15 = 0.2500 | | |
| r16 = 12.1386 | d16 = 3.1000 | n d9 = 1.56873 | ν d9 = 63.16 |
| r17 = −35.9472 | d17 = 0.4000 | | |
| r18 = 71.0439 | d18 = 0.7000 | n d10 = 1.84666 | ν d10 = 23.78 |
| r19 = 6.0080 | d19 = (Variable) | | |
| r20 = 7.8703 (Aspheric) | d20 = 3.7500 | n d11 = 1.58913 | ν d11 = 61.18 |
| r21 = −48.5346 | d21 = (Variable) | | |
| r22 = ∞ | d22 = 1.6000 | n d12 = 1.51633 | ν d12-64.15 |
| r23 = ∞ | d23 = 0.5000 | | |
| r24 = ∞ | d24 = 0.6000 | n d13 = 1.48749 | ν d13 = 70.20 |
| r25 = ∞ | | | |

Zooming Spaces

| f | 6.180 | 16.963 | 46.560 |
|---|---|---|---|
| d5 | 0.900 | 9.896 | 15.656 |
| d10 | 15.656 | 6.660 | 0.900 |
| d19 | 5.121 | 2.946 | 6.744 |
| d21 | 3.123 | 5.298 | 1.500 |

Aspherical Coefficients
12 th surface
$P = 0.5397$
$A_4 = -080521 \times 10^{-4}$
$A_6 = -0.20619 \times 10^{-6}$
$A_8 = 0.53912 \times 10^{-8}$
$A_{10} = -0.56085 \times 10_{-9}$
13 th surface
$P = -29.0258$
$A_4 = 0.54034 \times 10^{-4}$
$A_6 = 0.44209 \times 10^{-6}$
$A_8 = -0.22407 \times 10^{-7}$
$A_{10} = -0.18512 \times 10^{-9}$
20 th surface
$P = 1.2111$
$A_4 = -0.20395 \times 10^{-3}$
$A_6 = 0.11224 \times 10^{-7}$
$A_6 = 0.11224 \times 10^{-7}$
$A_8 = -0.39445 \times 10^{-6}$
$A_{10} = 0.11061 \times 10^{-7}$

EXAMPLE 2

$f = 6.180 \sim 16.963 \sim 46.559$
$F_{NO} = 1.44 \sim 1.57 \sim 2.10$
$\omega = 27.0 \sim 10.5 \sim 3.9°$

| | | | |
|---|---|---|---|
| r1 = 38.3304 | d1 = 0.9000 | n d1 = 1.84666 | ν d1 = 23.78 |
| r2 = 18.9312 | d2 = 5.4500 | n d2 = 1.58913 | ν d2 = 61.18 |
| r3 = 490.7631 | d3 = 0.1500 | | |
| r4 = 20.5757 | d4 = 3.9000 | n d3 = 1.68250 | ν d3 = 44.65 |
| r5 = 132.2037 | d5 = (Variable) | | |
| r6 = 131.1997 | d6 = 0.7500 | n d4 = 1.80610 | ν d4 = 40.95 |
| r7 = 6.2970 | d7 = 2.9500 | | |
| r8 = −10.4743 | d8 = 0.7000 | n d5 = 1.48749 | ν ds = 70.20 |
| r9 = 9.2149 | d9 = 2.000 | n d6 = 1.84666 | ν d6 = 23.78 |
| r10 = 56.1756 | d10 = (Variable) | | |
| r11 = ∞ (Stop) | d11 = 1.5000 | | |
| r12 = 10.2781 (Aspheric) | d12 = 3.6000 | n d7 = 1.67790 | ν d7 = 55.33 |
| r13 = −56.0507 | d13 = 0.2500 | | |
| r14 = ∞ | d14 = 1.4000 | n d8 = 1.49216 | ν d8 = 57.50 |
| r15 = ∞ | d15 = 0.2500 | | |
| r16 = 12.0154 (Aspheric) | d16 = 3.1000 | n d9 = 1.56873 | ν d9 = 63.16 |
| r17 = −29.6263 | d17 = 0.4000 | | |
| r18 = 70.3998 | d18 = 0.7000 | n d10 = 1.84666 | ν d10 = 23.78 |
| r19 = 6.0757 | d19 = (Variable) | | |
| r20 = 7.9744 (Aspheric) | d20 = 3.7500 | n d11 = 1.58913 | ν d11 = 61.18 |
| r21 = −63.9789 | d21 = (Variable) | | |
| r22 = ∞ | d22 = 1.6000 | n d12 = 1.51633 | ν d12-64.15 |
| r23 = ∞ | d23 = 0.5000 | | |
| r24 = ∞ | d24 = 0.6000 | n d13 = 1.48749 | ν d13 = 70.20 |
| r25 = ∞ | | | |

-continued

Zooming Spaces

| f | 6.180 | 16.963 | 46.559 |
|---|---|---|---|
| d5 | 0.900 | 9.826 | 15.525 |
| d10 | 15.525 | 6.599 | 0.900 |
| d19 | 5.274 | 2.980 | 6.791 |
| d21 | 3.017 | 5.311 | 1.500 |

Figure 2:
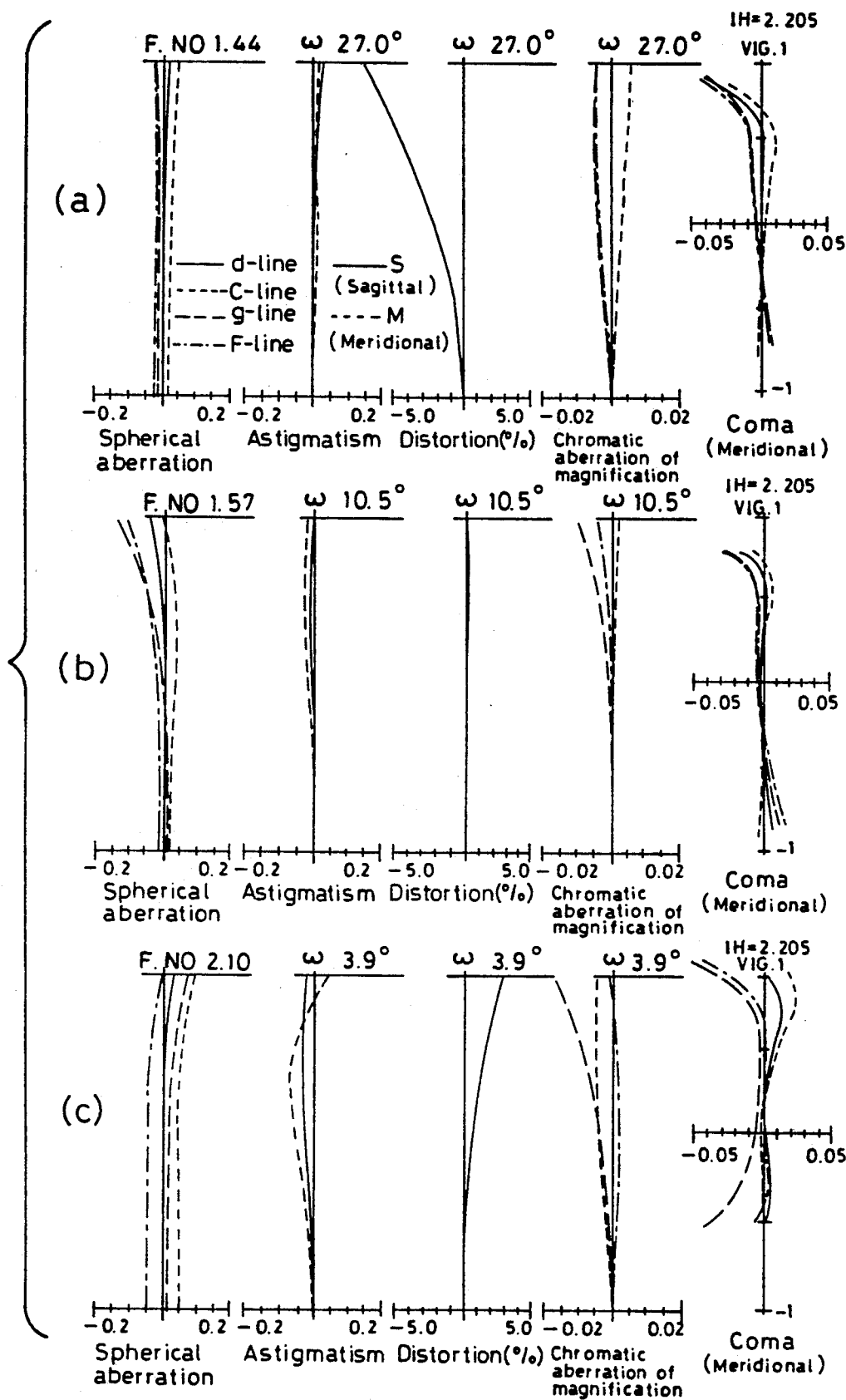
FIG. 2(a)-(c) shows aberration diagrams showing the spherical aberration, astigmatism, distortion, chromatic aberration of magnification and coma (meridional) of Example 1 at the (a) wide angle end, (b) standard and (c) telephoto end settings.
Figure 3:
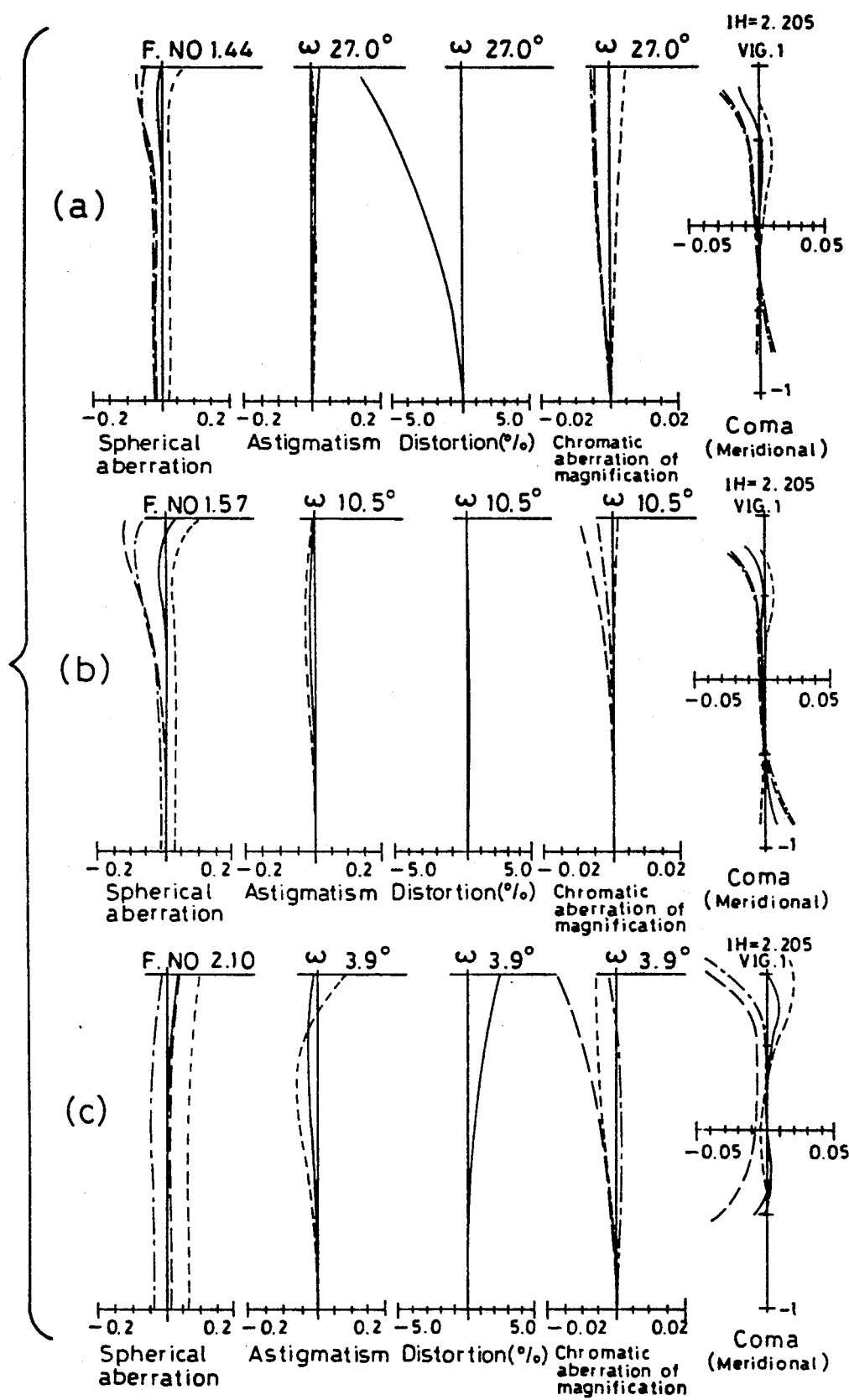
FIG. 3(a)-(c) shows aberration diagrams of Example 2, which are similar to those of FIG. 2.

Aspherical Coefficients
12 th surface
$P = 0.4912$
$A_4 = -0.87952 \times 10^{-4}$
$A_6 = -0.69392 \times 10^{-6}$
$A_8 = -0.23227 \times 10^{-7}$
$A_{10} = -0.34311 \times 10^{-9}$
16 th surface
$P = -0.1679$
$A_4 = 0.67900 \times 10^{-4}$
$A_6 = -0.111688 \times 10^{-5}$
$A_8 = -0.16885 \times 10^{-6}$
$A_{10} = -0.31967 \times 10^{-8}$
20 th surface
$P = 1.2317$
$A_4 = -0.17339 \times 10^{-3}$
$A_6 = 0.25942 \times 10^{-6}$
$A_8 = -0.42186 \times 10^{-6}$
$A_{10} = 0.12383 \times 10^{-7}$ The spherical aberrations, astigmatisms, distortions, chromatic aberrations of magnification and coma (meridional) of Examples 1 and 2 at the (a) wide angle end, (b) standard and (c) telephoto end settings are shown in the aberration diagrams of FIGS. 2 and 3.

Enumerated below are the values of Conditions (1)-(10) as well as $n_5$ and $n_6$ referred to in the examples.

| Conditions | Example 1 | Example 2 |
|---|---|---|
| 1 | 0.7008 | 0.6948 |
| 2 | 0.431 | 0.449 |
| 3 | 0.8938 | 0.8938 |
| 4 | 0.4183 | 0.4230 |
| 5 | 0.5718 | 0.5718 |
| 6 | 1.0313 | 1.0227 |
| 7 | 0.3934 | 0.3872 |
| 8 | −0.1127 | 10.1380 |
| 9 | −0.7209 | −0.1380 |
| 10 | $0.4658 \times 10^{-2}$ | $0.4435 \times 10^{-2}$ |
| $n_5$ | 1.48749 | 1.48749 |
| $n_6$ | 1.84666 | 1.84666 |

As described above, the present invention achieves a zoom lens system which comprises a zoom subsystem consisting of a first lens unit having a positive refracting power and a second lens unit having a negative refracting power and an image formation subsystem consisting of a third lens unit having a positive refracting power and remaining constantly fixed and a fourth lens unit having a positive refracting power and being movable for zooming and focal position regulation and which has a zoom ratio of 8, a field angle of 1.4 and a very short total length including filters, as expressed by 9.7 $f_W$ at 54°, is reasonably and well balanced for various aberrations inclusive of spherical aberration, and has a very excellent capability of forming images by adopting some suitable means for the paraxial arrangement, actual lens configuration an arrangement of the image formation subsystem, applying aspherical configuration to a part thereof and taking some pertinent means for the positions of various optical filters. In addition, the present zoom lens system comprises as small a number of lenses as ten lenses.

What is claimed is:

1. A zoom lens system including, in order from the object side, a first lens unit having a positive refracting power, a second lens unit having a negative refracting power and movable along the optical axis for zooming, a third lens unit having a positive refracting power and a fourth lens unit having a positive refracting power and movable along the optical axis for zooming and focusing, said third lens unit comprising, in order from the object side, a positive lens in which the object-side surface is an aspherical surface whose amount of displacement form the reference spherical surface to the object side increases monotonically as it is spaced away from the optical axis, a positive lens and a negative lens in which the image-side surface has a stronger curvature, said forth lens unit comprising a positive single lens in which the object-side surface takes an aspherical surface whose amount of displacement from the reference spherical surface to the object side increases monotonically as it is spaced away from the optical axis, and said zoom lens system further including an optical member such as a moire-preventing or infrared-cutting filter between the two positive lenses of said third lens unit and meeting the following conditions:

$$0.45 < f_{34S}/(f_W f_T)^{\frac{1}{2}} < 0.9, \quad (1)$$

$$0.3 < \beta_{IV} < 0.6, \quad (2)$$

$$0.6 < r_{31}/\{(n_{31} - 1)(f_W f_T)^{\frac{1}{2}}\} < 1.2, \quad (3)$$

$$0.28 < r_{36}/\{(n_{36} - 1)(f_W f_T)^{\frac{1}{2}}\} < 0.56, \quad (4)$$

and $$0.38 < D_{III}/(f_W f_T)^{\frac{1}{2}} < 0.76, \quad (5)$$

where:

$f_W$ and $f_T$ are the focal lengths of the total system at the wide angle and telephoto ends, respectively, $f_{34S}$ is the composite focal length of the third and fourth lens units when the focal length of the total system lies at $(f_W f_T)^{\frac{1}{2}}$ and the object point at infinity is focused, $\beta_{IV}$ is the magnification of the fourth lens unit at the telephoto end and the object point at infinity is focused, $r_{31}$ is the radius of curvature of the reference spherical surface of the third lens unit proximate to the object side, $r_{36}$ is the radius of curvature of the surface of the third lens unit proximate to the image side, $n_{31}$ and $n_{36}$ ar the refractive indices of the positive and negative lenses of the third lens unit proximate to the object and image sides, respectively, and $D_{III}$ is the distance between the apices of the surfaces of the third lens unit proximate to the object and image sides, respectively.

2. A zoom lens system as claimed in claim 1, wherein the first and second lens unit conform to the following conditions (6) and (7):

$$0.7 < f_I/\{f_T(f_W f_T)^{\frac{1}{2}}\}^{\frac{1}{2}} < 1.4, \quad (6)$$

and $$0.26 < |f_{II}|/(f_W f_T)^{\frac{1}{2}} < 0.52, \quad (7)$$

where:

$f_I$ is the focal length of the first lens unit, and $f_{II}$ is the focal length of the second lens unit.

3. A zoom lens system as claimed in claim 2, which conforms to the following conditions (8) and (9):

$$-0.16 < f_W f_T/r_{34} r_{35} < -0.08, \quad (8)$$

and $$0.5 < SF_{41} < 1.0, \quad (9)$$

where:

$r_{34}$ and $r_{35}$ are the radii of curvature of the image-side surface of the positive lens of the third lens unit located on the image side and of the object-side surface of the negative lens of the third lens unit, respectively, and $SF_{41}$ is the shape factor of the positive lens of the fourth lens.

4. A zoom lens system as claimed in claim S, wherein the first lens unit includes, in order from the object side, a negative meniscus lens convex on the object side, a positive lens and a positive lens and the second lens unit includes, in order from the object side, a negative lens and a cemented negative lens obtained by cementing a bi-concave lens to a positive lens, and that the following conditions be satisfied:

$$0.3 \times 10^{-2} < f_W f_T/r_3/r_5 < 0.6 \times 10^{-2}, \text{ and} \quad (10)$$

$$1.45 < n_5 < n_6 - 0.25, \quad (11)$$

where:

$r_3$ and $r_5$ are the radii of curvature of the image-side surface of the object-side positive lens of the first lens unit and of the image-side surface of the image-side positive lens of the first lens unit, respectively, and $n_5$ and $n_6$ are the refractive indices of the respective lenses of the cemented lens of the second lens unit.

* * * * *